May 29, 1962 D. W. KAUFMANN 3,036,884
TREATMENT OF BULK SALT
Filed Dec. 10, 1956
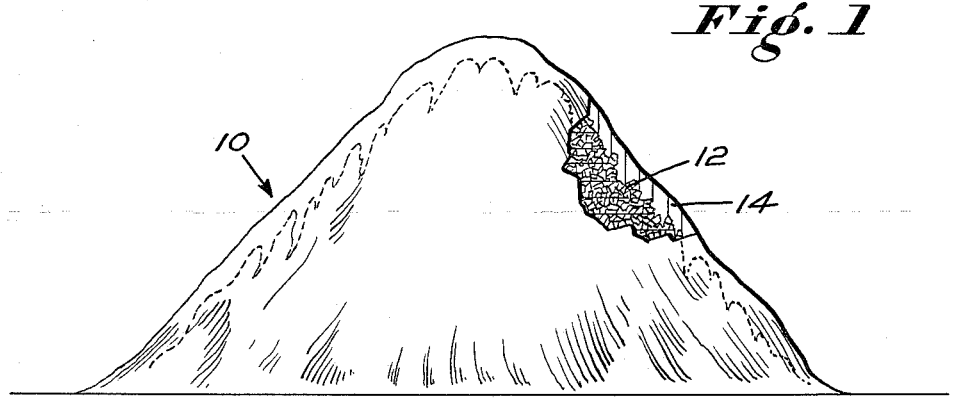
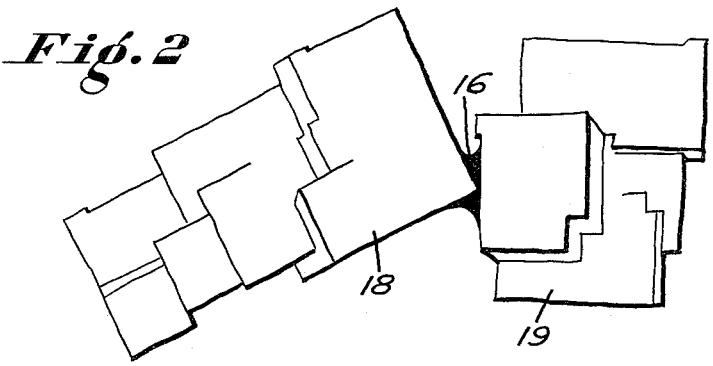
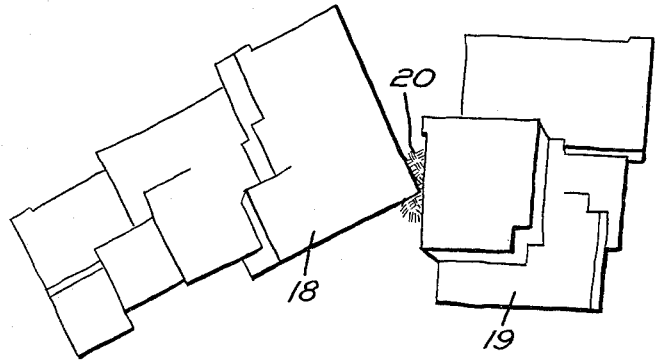
INVENTOR:
Dale W. Kaufmann
BY:
Bean, Brooks, Buckley & Bean,
ATTORNEYS.

3,036,884
TREATMENT OF BULK SALT
Dale W. Kaufmann, Buffalo, N.Y., assignor to International Salt Company, Scranton, Pa.
Filed Dec. 10, 1956, Ser. No. 627,463
15 Claims. (Cl. 23—89)

This invention relates to materials handling, and more particularly to stock-piling or similar storage of rock salt (sodium chloride) in bulk. Specifically, the invention relates to a method for treating a bulk of granular sodium chloride salt so as to render it substantially non-caking and readily frangible to facilitate normal handling thereof, even though it may have been exposed to alternating wetting and drying ambient atmospheric conditions; or to direct rainfall, or melting snow, or freezing temperatures. Thus, by the term "caking" as used herein, is meant the cohering of particles, granules or the like into a mass which is not readily frangible, whether the mechanism involved in such "caking" be due to alternate wetting and drying at temperatures above freezing (32° F.), exposure to moisture and freezing temperature, or combinations of these factors. This application is a continuation-in-part of my copending application Serial No. 470,365 filed Nov. 22, 1954, and now abandoned.

For example, rock salt is currently finding favor for street and highway deicing purposes, but the demand for such salt is of course concentrated during the winter months. As a consequence, economics suggest purchase and storage of the salt during summer months. However, when rock salt is stored in outdoor stock piles or in open air sheds or even in closed buildings, the normally changing temperature and/or humidity conditions tend to cause the salt to cake and harden, progressively inwardly from the covering layer thereof, so that in a relatively short time the interior of the salt pile is rendered substantially inaccessible such as by ordinary hand shoveling operations. Then in order to render the salt useful, the pile must be broken into by use of a pick axe or other drastic means which usually results in first breaking the material into large aggregates or lumps which must be further broken down to the original granular size prior to the intended use.

It appears that this caking of stock-piled rock salt is the result of alternate sorption and evaporation of water from the salt particles as the partial pressure of water vapor in the atmosphere rises above and falls below the vapor pressure of a saturated solution of the salt. The water sorbed on the surface of each salt particle forms a surface film of saturated sodium chloride solution which collects by capillary action at each point of contact between adjacent particles of salt. This liquid bridge becomes a solid crystalline bridge when the contained water has evaporated, and the particles of salt are thus "welded" together. This explains the fact that salt pile caking is caused by first wetting of the salt and subsequent drying of the wetted salt. The presence of freezing temperatures will of course aggravate the problem due to formation of a "welded" bridge of ice or sodium chloride dihydrate or eutectic, depending upon the temperature.

A primary object of the present invention is to provide a relatively simple and industrially feasible method for treating a given bulk of granular sodium chloride salt or the like, such as is stock-piled or otherwise stored under such conditions as to be exposed to varying humidity conditions, so as to render the salt bulk in toto substantially non-caking. Another object of the invention is to provide a method as aforesaid which will also reduce the tendency of the salt pile to freeze when wetted under relatively low temperature conditions.

Whereas, theoretically, the objectives of the present invention might be obtained by a number of expedients, experiments and actual tests have shown that the majority of such theories are either fallacious or impracticable for various reasons; but that surprisingly good results are consistently and economically obtainable in accord with the method of the present invention as set forth hereinafter.

In accord with the concept of the present invention an additive was sought such as would be relatively cheap and adapted to be mixed into or sprinkled upon a rock salt pile so as to settle into the interstices thereof; the additive being of such nature as to cause the salt to effloresce under low humidity conditions into a low-density powder such as would tend to relatively insulate adjoining salt particles. Thus, it was thought that such "insulations" would prevent brine-bridging and subsequent crystalization "welding" between adjacent salt particles. Series of tests finally resulted in determination of several substances such as would satisfactorily operate in accord with the objectives of the invention. The best reagents from the standpoints of cost and operational effectiveness appear to be limited to the alkali metal and alkali earth metal groups of ferrocyanide and ferricyanide salts, which are water-soluble. Such materials include the potassium, calcium, and sodium ferro and ferricyanides; but because sodium ferrocyanide and sodium ferricyanide are by far the cheaper, yet highly effective for the purposes of the invention they are to be preferred. Tests have shown that these reagents will work well if added as a fine solid in amounts from ⅛ pound to 8 pounds per ton of salt, and either intimately mixed into the pile or simply dusted over the surface of the pile. Or, they may be added as a weak solution or as a suspension or slurry in the amount for example of ½ pound of ferro or ferricyanide per ton of salt, sprayed on the surface of the pile, or intimately mixed throughout. Or, they may be added as a much stronger solution sprayed over the surface of the pile. Or, the substance may be added in the form of crystals of approximately the same size as the salt crystals, and uniformly mixed throughout the pile. Thus, it might be expected that the anti-caking effect would last for the life of the salt pile. If excessive rainfall unduly leached out the additive from the pile, it may be conveniently retreated as desired by any of the methods mentioned hereinabove. Similarly, the other additives mentioned hereinabove may be applied to the stock pile in any preferred manner. In the accompanying drawing:

FIG. 1 illustrates in side elevation, with a portion broken away, a typical non-treated salt stock pile which is surface-caked or hardened;

FIG. 2 illustrates, on greatly enlarged scale, the form of crystalline salt bridging or "welding" which normally occurs between adjacent stock-piled salt crystals; and FIG. 3 is a view corresponding to FIG. 2 but showing the form of contact "insulation" between adjacent salt crystals which results in accord with the present invention, to prevent salt stock pile caking tendencies.

As illustrated in FIG. 1, a salt stock pile is shown therein as indicated generally at 10 to comprise a mass of granular rock salt particles as indicated at 12. As explained hereinabove, under normal, varying atmospheric humidity conditions, the salt of the stock pile tends to cake as indicated at 14 progressively inwardly from the outer surface thereof as the stock pile is exposed to alternately wetting and drying atmospheric conditions. As shown in FIG. 2, this caking or "welding" together of the salt granules develops in the form of a solid bridge of crystalline salt as indicated at 16 in the region of each contact between adjacent salt crystals as indicated at 18—19. However, as indicated at 20 in FIG. 3, when the method of the present invention is applied to the stock pile, the additive substance causes the salt to effloresce and develop a frangible powdery "insulation" mass in the areas adjacent the contacts between adjoining crystals; thereby precluding the building of weldments of solid crystalline salt therebetween, as illustrated in FIG. 2.

Thus, it will be appreciated that although the rock salt granules of the stock pile are in nowise deleteriously affected by the additive substance, in accord with the method of the present invention, they are precluded from becoming welded together under the conditions hereinabove specified; and thus the stock pile remains free-flowing and readily accessible for handling and subsequent use of the salt granules with maximum facility and optimum results. By the terms "normal bulk density," "normal bulk density crystalline structure" and "crystalline structure and normal bulk density" as used herein is meant the solid cubic crystalline structure as opposed to skeletal, open or other crystalline structure which would exhibit lower than normal bulk density. As explained hereinabove, only a relatively small amount of the additive substance will perform in accord with the present invention to preclude caking of bulk salt, as explained hereinabove, but it will be appreciated that the additive must be thoroughly distributed throughout the salt bulk in order to be effective for the intended purpose. To facilitate uniform and thorough distribution of the additive material throughout any given salt bulk, it has been determined that the additive substance may be beneficially furnished to the ultimate user in the form of an admixture in a relatively inert vehicle or diluent such as powdered limestone, powdered gypsum, powdered wollastonite, or some other relatively insoluble granular substance.

Thus, for example, a pound or so of the cyanide salt may be mixed into a fifty or hundred pound sack of powdered limestone and thus will be adapted to be relatively easily sprinkled and mixed into a ton or two of bulk salt for the purposes explained hereinabove. Also, some additional additives such as a fatty acid or derivative thereof or the like, may be beneficially added to the cyanide content of the additive mixture to improve the anti-freeze characteristics, and also to assist in spreading the cyanide mixture throughout the rock salt bulk. Substances suitable for such purposes include for example, stearic acid, palmitic acid, palm kernel fatty acid, coconut fatty acid or other constituent acids of the fats; also alkali and alkali earth salts of the fatty acids, such as sodium stearates; also glyceryl salts of the fatty acids, such as glyceryl stearate; also surface-active agents such as sodium salts of fatty alcohol sulfates and sulfonates, known as sulfated aliphatic esters or "sulfonated oils", also mineral oil or grease or other substances of an oily or greasy nature.

Still further, some suitable sticking agent such as glue, agar, Irish moss, or other suitable gel or colloid substance may be beneficially added in order to cause the cyanide salt to adhere to the rock salt crystals and to stay in place for optimum performance in accord with the intended purpose.

Whereas certain examples of the invention specifically described hereinabove have related to the treatment of so-called "rock salt," it will be obvious to those skilled in the art that the invention is equally applicable to other kinds of salt without regard to the source or method of manufacture; wherever it is desired to inhibit caking of a bulk of solid crystalline sodium chloride, without substantially altering its normal bulk density as above defined.

I claim:

1. A solid crystalline sodium chloride of normal bulk density having at least a partial coating of a water-soluble complex iron cyanide in an amount of not more than about 0.05% by weight and sufficient to inhibit the caking tendencies of said sodium chloride.

2. A process for inhibiting the caking of a bulk quantity of normal bulk density crystalline sodium chloride which comprises intimately mixing with said bulk quantity a water-soluble complex iron cyanide in an amount of about not more than 0.05% by weight and sufficient to inhibit the caking tendencies of said bulk quantity of sodium chloride.

3. Conditioned sodium chloride particles having non-caking properties comprising sodium chloride particles of crystalline structure and normal bulk density having at least a partial coating of water soluble complex iron cyanide in a small amount sufficient to inhibit adhesion of said sodium chloride particles, thereby decreasing the caking together of said sodium chloride particles.

4. The product of claim 3 wherein said complex iron cyanide is sodium ferrocyanide.

5. The product of claim 3 wherein said complex iron cyanide is sodium ferricyanide.

6. A bulk of conditioned granular sodium chloride having non-caking properties, which comprises granular, sodium chloride particles of normal bulk density crystalline structure and added water-soluble complex iron cyanide in a small amount sufficient to at least partially coat and inhibit adhesion of said granular sodium chloride particles and thereby inhibiting the caking together of said granular sodium chloride particles.

7. The product of claim 6 wherein said complex iron cyanide is a member of the group consisting of alkali metal ferricyanides, alkaline earth metal ferricyanides, alkali metal ferrocyanides, and alkaline earth metal ferrocyanides.

8. A process for inhibiting the caking of particulate sodium chloride of normal bulk density crystalline structure comprising applying to said particulate sodium chloride a water-soluble complex iron cyanide in a small amount sufficient to at least partially coat said particulate sodium chloride and inhibit the caking tendencies thereof.

9. The method of claim 8 wherein said iron cyanide complex is sodium ferrocyanide.

10. The method of claim 8 wherein said iron cyanide complex is sodium ferricyanide.

11. The method of claim 8 wherein said iron cyanide complex that is applied to said particulate sodium chloride is admixed with an inert particulate diluent.

12. The method of claim 8 wherein said iron cyanide complex is sprayed on said particulate sodium chloride.

13. The process of inhibiting the caking of granular sodium chloride comprising applying to granular sodium chloride particles of crystalline structure and normal bulk density a water-soluble complex iron cyanide in a minor amount sufficient to at least partially coat and inhibit the adhering together of said granular sodium chloride particles of solid cubic crystalline habit and thereby inhibiting the caking together of said granular sodium chloride particles.

14. A solid crystalline sodium chloride of normal bulk density having at least a partial coating of a water-soluble complex iron cyanide in a small amount sufficient to inhibit the caking tendencies of said sodium chloride.

15. A process for inhibiting the caking of a bulk quantity of normal bulk density crystalline sodium chloride which comprises intimately mixing with said bulk quantity a water-soluble complex iron cyanide in a small amount sufficient to inhibit the caking tendencies of said bulk quantity of sodium chloride.

References Cited in the file of this patent

UNITED STATES PATENTS

| | | |
|---|---|---|
| 2,421,185 | Comstock | May 27, 1947 |
| 2,539,012 | Diamond et al. | Jan. 23, 1951 |
| 2,642,335 | May et al. | June 16, 1953 |